United States Patent
Kundermann

[11] Patent Number: 6,155,392
[45] Date of Patent: Dec. 5, 2000

[54] HYDRODYNAMIC CLUTCH DEVICE WITH A DIVIDING WALL BETWEEN A HYDRODYNAMIC CIRCUIT AND A RESIDUAL CIRCUIT

[75] Inventor: Wolfgang Kundermann, Schweinfurt, Germany

[73] Assignee: Mannesmann Sachs AG, Schweinfurt, Germany

[21] Appl. No.: 09/398,941

[22] Filed: Sep. 17, 1999

[30] Foreign Application Priority Data

Sep. 16, 1998 [DE] Germany .................... 198 42 310

[51] Int. Cl.[7] ................................................. F16H 45/02
[52] U.S. Cl. ........................... 192/3.3; 192/48.3; 192/57
[58] Field of Search ................................ 192/3.3, 58.2, 192/58.3, 48.3, 57

[56] References Cited

U.S. PATENT DOCUMENTS

| | | | |
|---|---|---|---|
| 2,768,722 | 10/1956 | Muller | 192/58.3 X |
| 4,108,289 | 8/1978 | Arai et al. | 192/3.3 |
| 5,346,043 | 9/1994 | Haka | 192/3.29 |
| 5,407,041 | 4/1995 | Fukunaga et al. | 192/3.3 X |
| 6,012,558 | 1/2000 | Kundermann | 192/3.3 X |
| 6,016,894 | 1/2000 | Kundermann | 192/3.3 |

FOREIGN PATENT DOCUMENTS 41 21 586 A1  1/1993  Germany .................... F16H 45/02

*Primary Examiner*—Rodney H. Bonck
*Attorney, Agent, or Firm*—Cohen, Pontani, Lieberman & Pavane

[57] ABSTRACT

A hydrodynamic clutch device is formed with a hydrodynamic circuit comprising at least an impeller and turbine wheel and with a residual circuit in which is provided at least a lockup clutch for fixing the turbine wheel relative to a drive. The residual circuit is supplied, via a hydraulic supply system, with switchable pressure medium lines for controlling the lockup clutch. The hydrodynamic circuit is at least substantially isolated from the residual circuit by a dividing wall and is at least partially filled with a medium whose density exceeds that of the medium used for supplying the residual circuit.

14 Claims, 4 Drawing Sheets

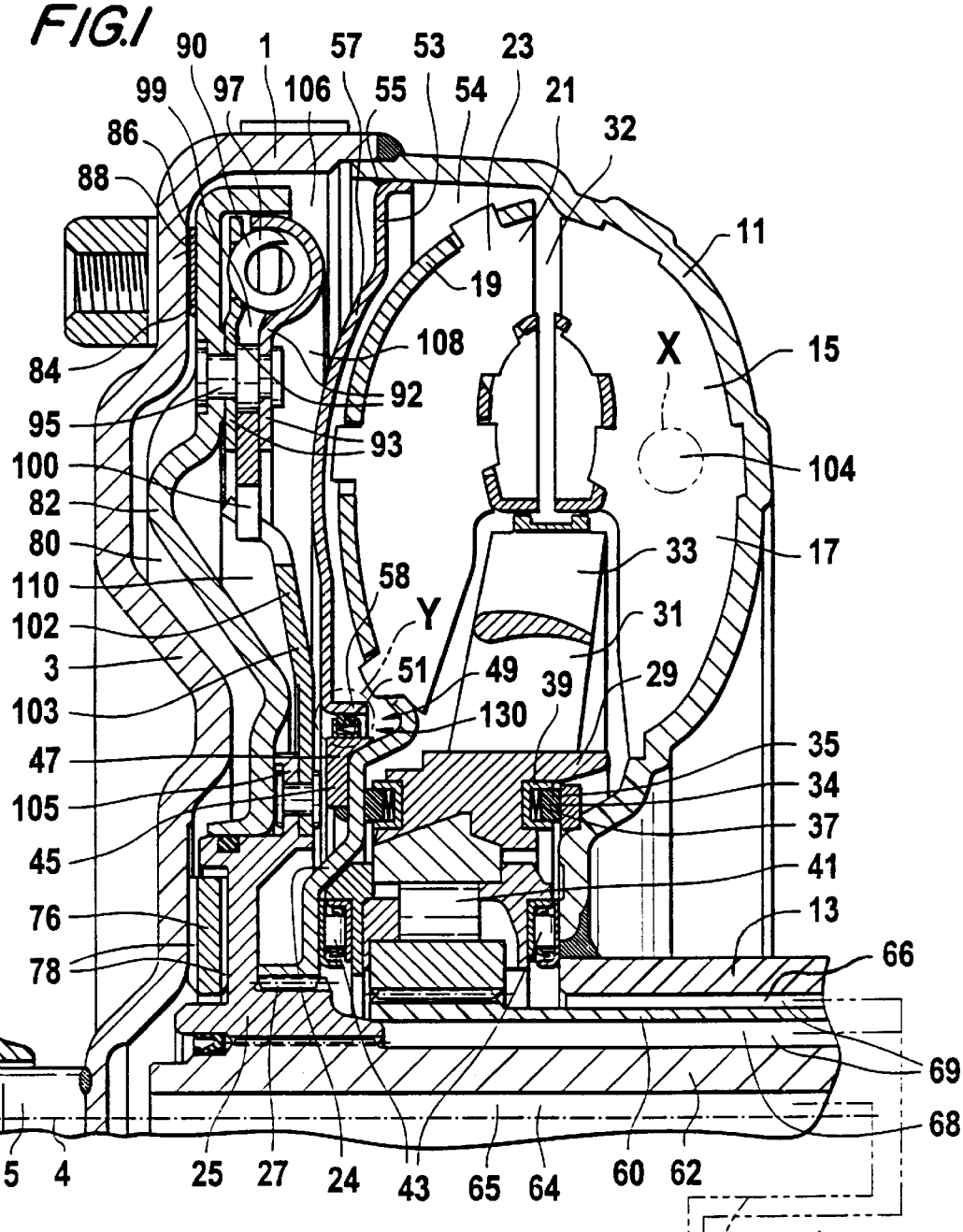
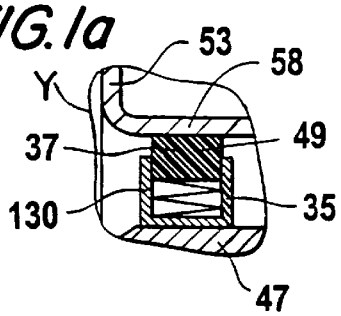

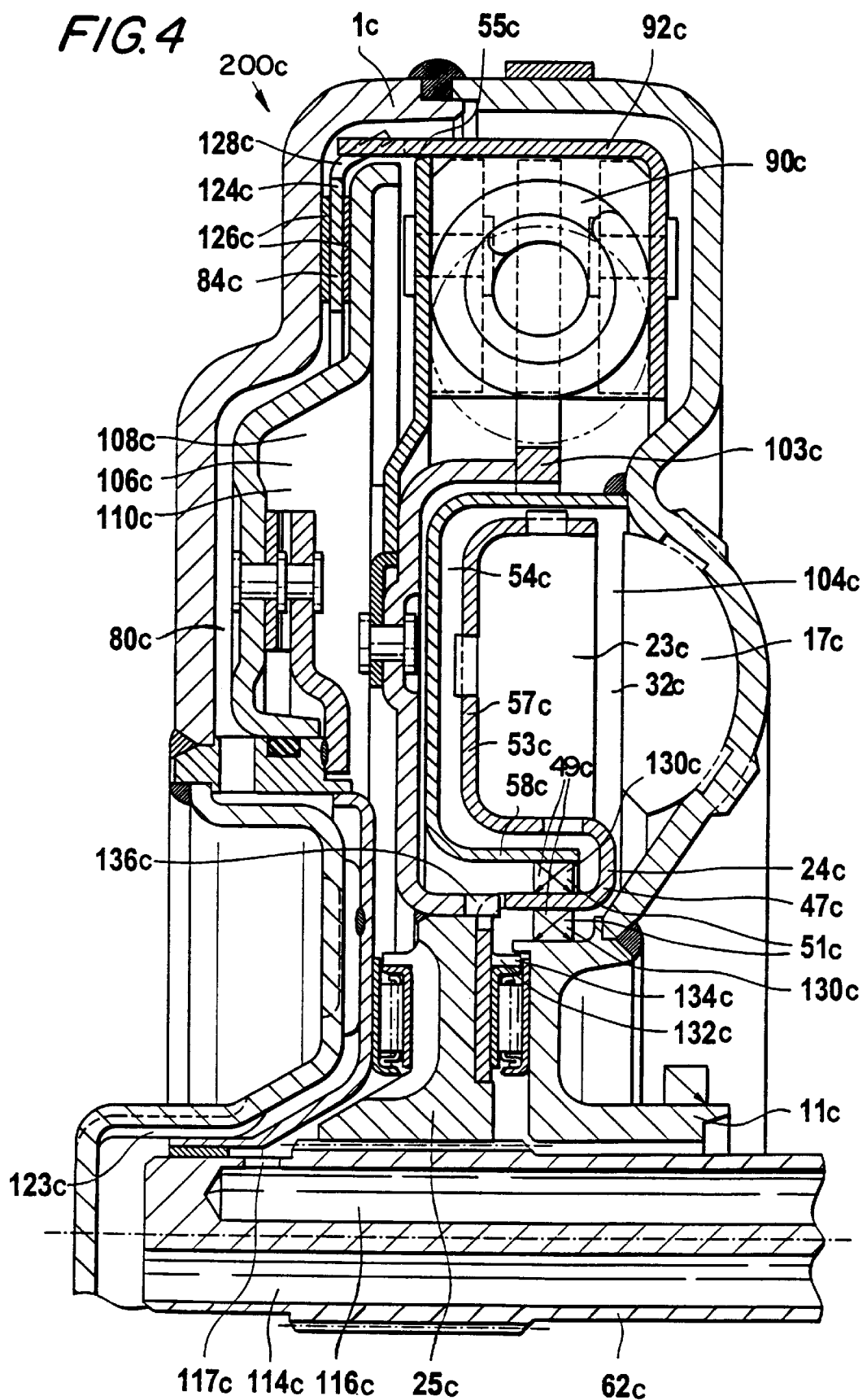

HYDRODYNAMIC CLUTCH DEVICE WITH A DIVIDING WALL BETWEEN A HYDRODYNAMIC CIRCUIT AND A RESIDUAL CIRCUIT

BACKGROUND OF THE INVENTION

1. Field of the Invention

The invention is directed to a hydrodynamic clutch device with a hydrodynamic circuit including a turbine wheel and an impeller wheel and a residual circuit including a lockup clutch for selectively fixing the turbine wheel relative to a drive.

2. Description of the Related Art

A hydrodynamic clutch device in the form of a torque converter, whose hydrodynamic circuit comprises an impeller, turbine and stator, is known from German reference DE 41 21 586 Al, particularly from FIG. 1 and the associated part of the specification. Apart from this hydrodynamic circuit, the clutch housing further comprises a lockup clutch which is provided for fixing the turbine wheel relative to a drive, e.g., the crankshaft of an internal combustion engine, and which is supplied via a hydraulic supply system with switchable pressure medium lines for controlling the lockup clutch. A torsional vibration damper acting between the lockup clutch and the turbine wheel is also provided.

In hydrodynamic clutch devices of this type, the hydrodynamic circuit is bridged increasingly earlier for reasons pertaining to wear and, as the case may be, is utilized purely as a starting element. Since many drives, particularly internal combustion engines, generate relatively large torsional vibrations at comparatively low speeds, the earlier bridging times require that these torsional vibrations at low speeds must be compensated in the torsional vibration damper, so that torsional vibration dampers of increasingly larger volume are used. In view of the fact that the lockup clutch offers only very little leeway in terms of design for gaining axial installation space, a large torsional vibration damper can be carried out only at the expense of the axial extension of the hydrodynamic circuit. This results in hydrodynamic circuits which are increasingly narrower in the axial direction which leads to a reduced through-flow cross section between the other and inner torus and to decreased throughput, thereby reducing the starting torque of the torque converter. One solution is to axially flatten the construction of the inner torus. However, in conjunction with the axially narrow construction of the outer torus, this would produce flow problems between the individual running wheels, such as partial reflux and dead zones for flow, reducing the efficiency of the hydrodynamic circuit. Therefore, this solution increases starting torque at the cost of reduced efficiency.

In torque converters, the starting torque may also be influenced by the blade angle of the running wheels. However, an adjustment of the blade angles also affects the starting transmission ratio, which can have negative consequences depending on the intended use of the torque converter.

A further solution for increasing the starting torque is to increase the diameter of the hydrodynamic circuit, so that, as a result of the dependence of the pump torque on the outer diameter of the hydrodynamic circuit as $D^5$, the starting torque of the pump can be appreciably increased by only a slight increase in diameter. However, the increased inertia in the running wheels and the greater radial installation space requirement of even a slight increase in diameter are disadvantageously noticeable.

Hydraulic clutches which have narrower axial dimensions owing to the absence of the stator wheel and which also usually have a hydrodynamic circuit with a comparatively small cross section may be used as an alternative to torque converters. Compared with a torque converter, hydraulic clutches of this type have the disadvantage that there is no starting gear multiplication due to the absence of the stator. Further, the starting torque in hydraulic clutches of the type mentioned above is small, especially when the hydrodynamic circuit has a small cross section because of the small diameter ratio between the outer and inner diameter of the impeller and turbine.

SUMMARY OF THE INVENTION

It is the object of the invention to provide a hydrodynamic clutch device in the most economical design possible such that a high starting torque is achieved without the problems of the prior art.

The object is met according to an embodiment of the invention by a hydrodynamic clutch device connectable to a drive, comprising a hydrodynamic circuit comprising an impeller wheel connectable with the drive and rotatably mounted about an axis of rotation and a turbine wheel rotatably mounted about said axis of rotation, said hydrodynamic circuit being filled with a first medium having a first density, a residual circuit comprising a lockup clutch having a plurality of clutch components operatively connected for selectively fixing said turbine wheel to a component connected with said impeller wheel, a hydraulic supply system having switchable pressure medium lines operatively connected to said residual circuit for supplying a second medium to said residual circuit for controlling said lockup clutch, wherein a density of said first medium exceeds a density of said second medium, and a dividing wall arranged for substantially isolating said hydrodynamic circuit from said residual circuit.

According to the invention, the starting torque of the hydrodynamic circuit and its clutch device may be increased by using a medium of higher density. However, suitable media for this purpose are either expensive, result in increased wear with respect to the lockup clutch such, for example, as when the elevated density is achieved through the addition of solid particles of very high density to a carrier fluid, or may cause undesirable behaviour of the clutch device with respect to coefficient of friction, cooling and lubrication. Accordingly, the clutch device using the medium of higher density must be constructed to ensure that the higher-density medium is used only at the location in the clutch device where it achieves a beneficial effect, i.e., only in the area of the hydrodynamic circuit, while a suitable inexpensive medium flows through the residual circuit of the clutch device having the lockup clutch and, where appropriate, a torsional vibration damper. Accordingly, the clutch device of the present invention is divided into two circuits by a dividing wall which is fastened to a structural component part of the clutch such, for example, as the clutch housing and which contacts, via a seal, a second structural component part of the clutch such, for example, as a structural component part of the turbine wheel which is movable relative to the first structural component part of the clutch. This arrangement has the following results:

A space is formed in the clutch device which houses the hydrodynamic circuit and is filled with a medium of higher density. Both the dividing wall and the seal are constructed such that the medium cannot exit the space under any circumstances. In this manner, a relatively small quantity of higher-density medium is sufficient for increasing the starting torque of the clutch device, so that costs for this medium are kept low.

Since the higher-density medium is not exchanged, but always remains inside the space receiving the hydrodynamic circuit, this medium may be easily be formed by introducing solid particles of high density into an optional carrier fluid. Graphite powder is particularly suitable as solid particles because it has a lubricating effect in addition to a density-elevating effect.

During the operation of the hydrodynamic circuit, the higher-density medium may become heated as a result of slippage. However, this heating is not critical because a conventional medium, e.g., mineral oil, flows through the residual circuit in a manner typical of hydrodynamic clutch devices. This medium flows from a hydraulic supply system and is returned to this supply system after flowing through the residual circuit. When flowing through the residual circuit, this medium is also guided along the side of the dividing wall remote of the hydrodynamic circuit and therefore conducts heat that has been transferred from the higher-density medium to the dividing wall out of the clutch device. This arrangement effectively prevents an overheating of the hydrodynamic circuit. A constant feed of fresh medium in the residual circuit is always ensured because, for example, the adjustment of the lockup clutch in a determined position is carried out depending on the pressure ratios within the residual circuit.

Because the hydrodynamic circuit is sealed, a slight heating of the higher-density medium in the hydrodynamic circuit results in a pressure increase in the corresponding space. To compensate for this pressure increase, the dividing wall may be constructed as a diaphragm-like element, so that the dividing wall counters a rise in pressure through natural deformation. Alternatively, when a more rigid dividing wall is used the seal is constructed in such a way that it substantially prevents a rise in pressure in the hydrodynamic circuit. For this purpose, for example, sealing elements of the seal may be arranged so as to be movable. The movement of the sealing elements provides for a change in volume of the space receiving the hydrodynamic circuit through their movement relative to the dividing wall. Another possible seal enables a deliberate leakage flow of viscous medium between the two circuits. Since the hydrodynamic circuit has a comparatively small volume, even a small leakage flow is sufficient for a pressure compensation. Such pressure compensation is useful because, for example, during operation of the hydrodynamic circuit the medium located therein is thrown radially outward due to centrifugal force, so that a vacuum can develop in the radial inner area, which solves the problem of cavitation. Therefore, an excessive pressure drop in the radial inner area of the hydrodynamic circuit must be avoided under all circumstances.

Returning to the subject of the permeability of the seal for a small leakage flow of viscous medium, it is noted that the medium of higher density must on no account exit from the hydrodynamic circuit. Therefore, the seal is constructed in such a way that when the clutch device is at a standstill the force of gravity acting on the medium present in the hydrodynamic circuit is not sufficient to push the higher-density medium past the seal into the residual circuit. The seal should permit a leakage flow only when there is a determined pressure difference between the two circuits, wherein an overpressure is built up in the residual circuit due to the constant feed of hydraulic fluid. A vacuum in the radial inner area of the hydrodynamic circuit coincides with the overpressure in the residual circuit because, as was already explained, the higher-density medium in the hydrodynamic circuit is thrown radially outward as a result of centrifugal force during operation of the clutch device. Due to the resulting pressure difference on either side of the seal, medium is sucked out of the residual circuit into the hydrodynamic circuit via the seal.

This medium remains on the radial inner side because of its lower density in comparison with the medium already located in the hydrodynamic circuit and accordingly serves as buffer fluid. Conversely, a thermally induced overpressure in the hydrodynamic circuit results in that the above-mentioned buffer fluid, that is, the lower-density medium, is pushed back into the residual circuit via the seal. Accordingly, exclusively lower-density medium flows through the seal as residual leakage.

Suitable seals for operation of the type described above may, for example, comprise easily deformable elastomer seals or seals with at least one spring-loaded sealing means, i.e., sliding ring seals. Since the seal may assume the function of pressure compensation in the hydrodynamic circuit, the seal may reasonably act as a valve element. Of course, an additional valve element may also be used as an alternative to a dividing wall acting as a diaphragm-like element or a pressure-compensating seal.

The medium of higher density used in the hydrodynamic circuit may be formed not only by the addition of solid particles of high density to a carrier fluid, but also by special fluids such as high-density oils such, for example, as polyglycol and silicone oil.

It is noted by way of addition that the solution according to the invention, namely, filling a sealed hydrodynamic circuit with a medium of higher density, can be applied in a torque converter whose hydrodynamic circuit has a stator as well as in a hydraulic clutch with a hydrodynamic circuit not having a stator.

The various features of novelty which characterize the invention are pointed out with particularity in the claims annexed to an forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

In the drawings, wherein like reference characters denote similar elements throughout the several views:

FIG. 1 is a longitudinal sectional view of an embodiment of a hydrodynamic clutch device having a dividing wall according to the present invention;

FIG. 1a is a detailed view of an alternative embodiment of a seal in the area Y in FIG. 1;

FIG. 1b is a detailed view of an alternative medium in area X in FIG. 1;

FIG. 4 is a longitudinal sectional view of yet another embodiment of a hydrodynamic clutch device having a dividing wall according to the present invention.

DETAILED DESCRIPTION OF THE PRESENTLY PREFERRED EMBODIMENTS

Figure 2:
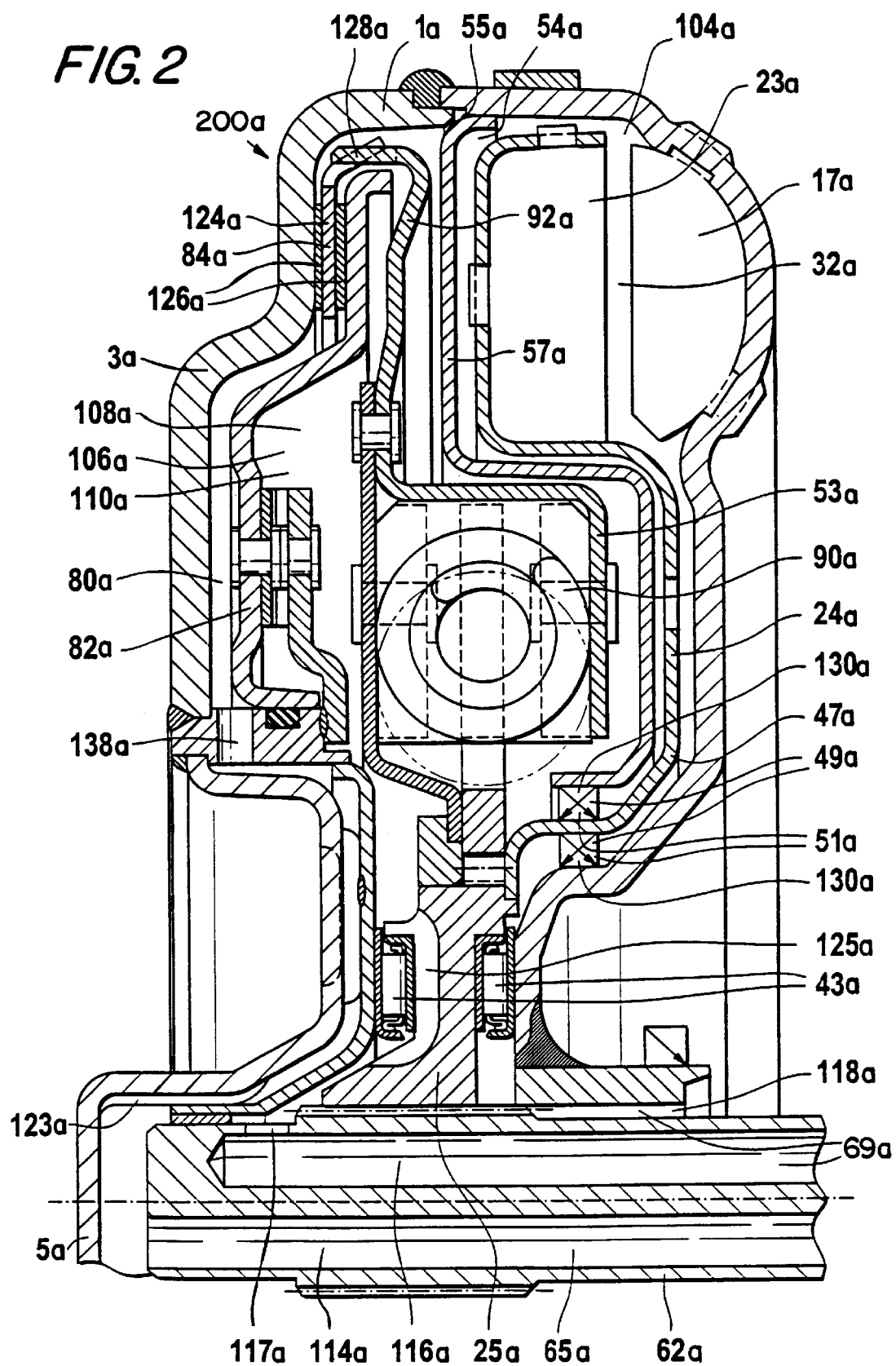
FIG. 2 is a longitudinal sectional view of another embodiment of a hydrodynamic clutch device having a dividing wall as a diaphragm-like element according to the present invention.

A hydrodynamic clutch element shown in FIG. 1 is a torque converter 200 with a clutch housing 1 which has a radial flange 3 on a side of the hydrodynamic clutch element facing a drive 7, e.g., the crankshaft 9 of an internal combustion engine. The radial flange 3 has a bearing journal 5 in the area of a center axis 4 which is insertable in a corresponding recess of the crankshaft 9. The radial flange 3 is fixedly connected with an impeller shell 11 which includes an impeller hub 13 connected on a radially inner end of the impeller shell and extending in the direction of the power output connection, e.g., a transmission. The impeller shell 11 is constructed with a vane arrangement 15 to form an impeller wheel 17. This impeller wheel 17 cooperates with a turbine wheel 23 having a turbine shell 19 and a vane arrangement 21 fastened thereto. A radially inner end of the turbine shell 19 forms a turbine base 24 which is in an operative connection via a toothing 27 with a turbine hub 25. A driven shaft 62 which is typically a transmission input shaft is operatively connected to the turbine base 24 via the turbine hub 25.

A stator wheel 31 is arranged axially between the impeller wheel 17 and turbine wheel 23 and, together with the two above-mentioned wheels 17 and 23, forms a hydrodynamic circuit 32. The stator wheel 31 has a stator wheel hub 29 which receives a vane arrangement 33 and has a guide 39 for each spring-loaded sealing means 37 in axial recesses. The spring loaded sealing means 37 is part of a seal 34 formed as a sliding ring seal 35. One of the spring-loaded sealing means 37 axially contacts the impeller shell 11 and the other axially contacts the turbine base 24 of the turbine shell 19, thereby scaling the hydrodynamic circuit 32 on the radial inner side.

The stator wheel hub 29 of the stator wheel 31 is arranged on a freewheel 41 which is axially fixed between the impeller shell 11 and the turbine shell 19 via axial bearings 43 and is supported via a toothing at a freewheel support 60 which extends radially inside of the impeller hub 13. The freewheel support 60 and the impeller hub 13 enclose an annular channel 66. The freewheel support 60 in turn encloses the driven shaft 62 while forming an annular channel 68 therebetween. The two annular channels 66 and 68 act as a pressure medium line 69. The driven shaft 62 has a center bore 64 which acts as a pressure medium line 65. These two pressure medium lines 65 and 69 are connected, via a switching valve 70, with a supply reservoir 72 for viscous medium. A pump 74 is associated with this supply reservoir 72 for delivery of the viscous medium to one of the pressure lines 65 and 69, depending on the position of the switching valve 70. The supply reservoir 72 is usually filled with a medium 106 of relatively low density such, for example, as mineral oil.

Returning to the construction design of the torque converter 200, a side of the turbine hub 25 facing the radial flange 3 contacts the radial flange 3 via an axial bearing 76 having radial grooves 78 on both sides. Further, the turbine hub 25 has a circumferential surface for receiving a piston 82 of a lockup clutch 84. A radially outer area of the piston 82 carries a friction facing 86 which can be brought into contact with a friction surface 88 at the adjacent radial flange 3 of the clutch housing 1. A first chamber 80 remains axially between the piston 82 and the radial flange 3, while a second chamber 110 is provided on the side of the piston 82 facing the hydrodynamic circuit 32. The piston 82 is axially displaceably arranged on the turbine hub 25.

A torsional vibration damper 90 is provided at the side of the piston 82 facing the hydrodynamic circuit 32. An input part 92 of the torsional vibration damper 90 includes two cover plates which are connected by riveting 95 with the piston 82. The input part 92 abuts one end of circumferential springs 97 which are supported at the other end at a hub disk 99. A radially inner area of the hub disk 99 is connected with a yoke 102 via a tooth engagement 100 and cooperates with this yoke 102 as an output part 103 of the torsional vibration damper 90. The yoke 102 is fastened to a radial projection 105 of the turbine hub 25 and, via the rest of the torsional vibration damper 90, provides for a rotational connection of the piston 82 with the turbine hub 23, which rotational connection is elastic in the circumferential direction.

A dividing wall 53 is fastened axially between the torsional vibration damper 90 and the turbine wheel 23 at a radial outer side of the clutch housing 1, i.e., at the impeller shell 11, via a weld 55. The dividing wall 53 divides a space 54 in which the hydrodynamic circuit 32 operates from a residual circuit 108 receiving the lockup clutch 84 and torsional vibration damper 90. The dividing wall 53 according to FIG. 1 has a very small cross section in the axial direction and acts as a diaphragm-like element 57 due to its axially elastic behavior. The dividing wall 53 includes a bend 58 in the radial inner area. A radially inner side of the bend 58 contacts a holder 45 via a seal 49. The holder 45 is fastened to the turbine base 24 and acts as a clutch component 47 whose movement coincides with that of the turbine wheel 23. The dividing wall 53 is movable relative to the turbine wheel 23. As is shown in FIG. 1, the seal 49 may be constructed as an elastomer seal 51 which is clamped in radially between the bend 58 of the dividing wall 53 and the holder 45 by natural deformation. As an alternative, FIG. 1a shows that the seal 49 may also be constructed as a sliding ring seal 35 with spring-loaded sealing means 37

When the switching valve 70 is positioned such that the medium 106 comprising mineral oil from the reservoir 72 flows under pressure through the pressure medium line 65, that is, the center bore 64 of the driven shaft 62, the medium 106 flows via the free end of the driven shaft 62 and the radial channels 78 in the axial bearing 76 into the first chamber 80 axially between the radial flange 3 and the piston 82. In this arrangement, an overpressure is formed in the first chamber 80 relative to the second chamber 110 at the opposite side of the piston 82 thereby urging the piston 82 toward the hydrodynamic circuit 32 so that the friction facing 86 at the piston 82 at least substantially releases the friction surface 88 at the radial flange 3. In this position, movements introduced from the drive 7 are accordingly transmitted via the hydrodynamic circuit 32 to the turbine hub 25 and from the latter to the driven shaft 62. However, as soon as the position of the switching valve 70 is moved into its other position, the medium 106 flows under pressure into the pressure medium line 69. In this position, the medium 106 passes from the supply reservoir 72 via the toothing 27 between the turbine base 24 and turbine hub 25 into the second chamber 110 and simultaneously flows out of the first chamber 80 via the radial channels 78 of the axial bearing 76 and the pressure medium line 65 back into the supply reservoir 72. Accordingly, an overpressure is formed in the second chamber 110 so that the friction facing 86 at the piston 82 is brought into an operative connection with the friction surface 88 at the radial flange 3. Consequently, regardless of the position of the switching valve 70, an overpressure is always formed via the medium 106 in one of the first and second chambers 80, 110 located within the residual circuit 108. In contrast, the space 54 and, in this connection, particularly the hydrodynamic circuit 32 is filled with a medium 104 comprising a higher density than that of medium 106. Referring to FIG. 1b, instead of the higher density of medium 104 a higher density may also be achieved by adding high-density solid particles 112 to a carrier fluid 111. The higher density fluid of medium 104 may, for example, comprise polyglycol or silicone oil. The carrier fluid 111 may also comprise a higher density fluid with additional solid particles 112 for an even higher density.

The seal 49 between the dividing wall 53 and the clutch component 47 and at least one additional seal 34 associated with the seal 49 effectively prevent the higher-density medium 104 from exiting the space 54 when the clutch housing 1 is stationary. The gravitational force acting on the medium 104 in this operating state is not sufficient for overcoming the seal 49 or the additional seal 34.

During rotation of the clutch housing 1 about the center axis 4, the medium 104 of higher density is thrown radially outward due to centrifugal force thereby creating a vacuum in the radial inner area of the hydrodynamic circuit 32. At the same time, an overpressure occurs in the residual circuit 108 due to the pressure acting on the residual circuit 108 via the pump 74 and the medium 106 as described above. The overpressure in the residual circuit 108 and the vacuum pressure on the other side of the seal 49 and the additional seals 34 causes a small leakage flow of medium 106 to pass from the residual circuit 108 into the hydrodynamic circuit 32. The medium 106 which passes into the hydrodynamic circuit 32 is distributed radially inside of the medium 104 because of its lower density compared with medium 104. That is, the medium 104 is centrifuged radially outward relative to medium 106. Therefore, the medium 106 acts as a buffer fluid between the hydrodynamic circuit 32 and the residual circuit 108 in the radial inner area of the hydrodynamic circuit 32.

When a relatively large slip occurs in the hydrodynamic circuit 32 between the impeller wheel 17 and the turbine wheel 23, the higher-density medium 104 may heat up slightly, causing a discernible rise in pressure in the hydrodynamic circuit 32 and accordingly in the space 54. As soon as the rise in pressure causes an overpressure in the hydrodynamic circuit 32 relative to the residual circuit 108, the medium 106 acting as buffer fluid is guided back again into the residual circuit 108 via the seal 49 and seal 34 as a leakage. The overpressure in the hydrodynamic circuit 32 is reduced by this leakage flow. A further reduction of the overpressure in the hydrodynamic circuit may be achieved by constructing the dividing wall 53 as a diaphragm-like element 57 capable of increasing the space 54 by axial deformation and causing a relaxing of pressure. However, the seal 49 may also be constructed as an elastomer seal 51 that is axially movable, so that a respective position of this elastomer seal 51 depends on the pressure difference between the hydrodynamic circuit 32 and the residual circuit 108 and is adjusted accordingly. A displacement of the seal 49 therefore causes a change in volume in the space 54 and accordingly a balancing of pressure in the hydrodynamic circuit 32. The seal 49 may also act as a pressure-compensating valve element 130. While the seal 49 may accordingly be stationary when using a dividing wall 53 as a diaphragm-like element 57, the alternative embodiment including a movable seal 49b in the construction according to FIG. 3 has a thicker and therefore dimensionally more stable dividing wall 53b. In the construction according to FIG. 3, the seal 49b is also advantageously formed with a spring-loaded sealing means 37b based on the arrangement of FIG. 1a, because this arrangement enables a precise adjustable leakage flow.

Returning to the problem of the heating of the higher-density medium 104 due to a large slip between the impeller wheel 17 and the turbine wheel 23, an efficient cooling is achieved in that fresh and therefore cooled medium 106 constantly flows against the side of the dividing wall 53 facing the residual circuit 108, thereby conducting heat away from the hydrodynamic circuit 32.

FIG. 2 shows another embodiment of the hydraulic clutch device according to the present invention, like elements include the same reference number as FIG. 1 embodiment with a suffix "a". In contrast to the embodiment form in FIG. 1, FIG. 2 shows a hydraulic clutch device comprising a hydraulic clutch 200a having only an impeller wheel 17a and turbine wheel 23a but no stator wheel. To achieve good performance, a hydrodynamic circuit 32a formed by the impeller wheel 17a and the turbine wheel 23a is arranged in a radially outer circumferential area of a clutch housing 1a and encloses a torsional vibration damper 90a arranged in the radial center area of the clutch housing 1a. An input part 92a of the torsional vibration damper 90a is in a rotation connection via a toothing 128a with a disk or plate 124a arranged axially between a radial flange 3a of the clutch housing 1a and a piston 82a of a lockup clutch 84a. The plate 124a and carries friction facings 126a on both sides which may be brought into contact with the corresponding friction surfaces of the radial flange 3a and piston 82a. Pressure is supplied to a chamber 80a located axially between the radial flange 3a and piston 82a via through-grooves 123a radially between the bearing journal 5a and the driven shaft 62a and via a passage 138a. The driven shaft 62a has a through-bore 114a which supplies space 80a with medium 106a via through-groove 123a and passage 138a for lifting off the piston 82a away from the clutch housing 1a, and canceling the frictional connection between the piston 82a and the clutch housing 1a. The medium 106a introduced into the residual circuit 108a flows through a space 110a radially inward and travels via radial grooves 125a in an axial bearing 43a located axially between the turbine hub 25a and radial flange 3a radially inward via a radial passage 117a in the driven shaft 62a into a pocket bore hole 116a. The pocket bore hole 116a and an annular channel 118a enclosing the driven shaft 62 together comprise a pressure medium line 69. The through-hole 114a is a pressure medium line 65a. Accordingly, the first and second chambers 80a and 110a of the residual circuit 108a receive medium 106a from a reservoir 72 (see FIG. 1) via the pressure medium lines 65 and 69.

In the embodiment of FIG. 2, the hydrodynamic circuit 32a is also filled with a medium 104a of higher density than the medium 106a and is separated from the residual circuit 108a by a dividing wall 53a formed as a diaphragm-like element 57a. The seal 49a may comprise a stationary elastomer seal 51a due to the axial elasticity of the dividing wall 53a.

Figure 3:
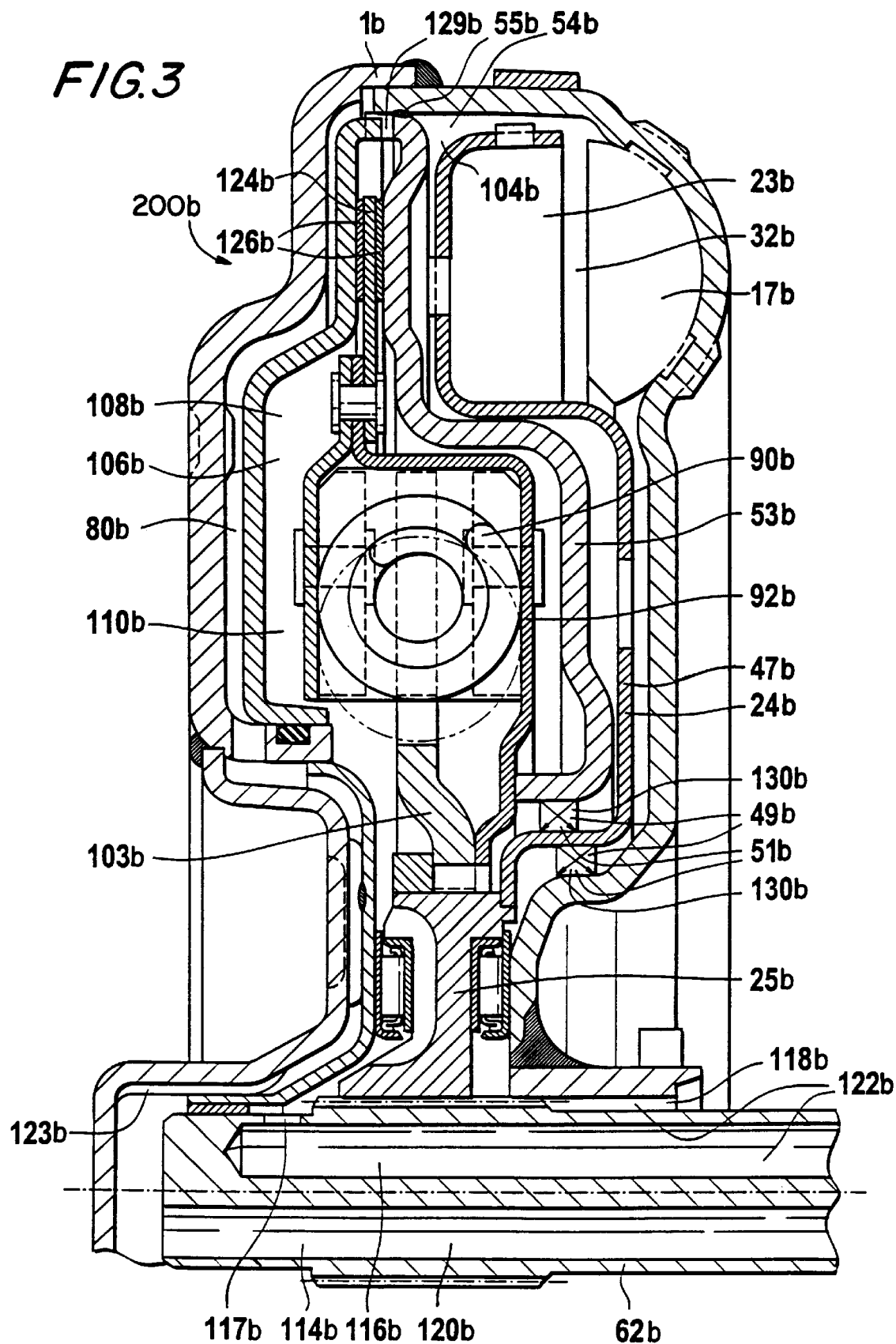
FIG. 3 is a longitudinal sectional view of another embodiment of a hydrodynamic clutch device having a stable dividing wall according to the present invention.

FIG. 3 shows a further embodiment of a hydrodynamic clutch device 200b in which elements which correspond to similar elements in FIGS. 1 and 2 have the same reference number with a suffix "b". In FIG. 3, a dividing wall 53b is dimensionally stable, so that, as was already mentioned, seals 49b may comprise either axially movable elastomer seals 51b or seals with spring-loaded sealing means 37b. In either case, since the dividing wall 53b lacks the possibility of pressure compensation through its own deformation, the seal 49b acts as a valve element 130b between the hydrodynamic circuit 32b and the residual circuit 108b. In connection with this embodiment form, it should also be noted that the dividing wall 53b which is fixedly connected via a weld 55b with the clutch housing 1b in the radial outer area of the clutch housing 1b, is also in a meshed engagement by meshing 129 with the piston 82b to secure the piston 82b against rotation in its circumferential area. Further, it should be mentioned that the plate 124b is connected with the input part 92b of the torsional vibration damper 90b so as to be fixed with respect to rotation relative to it. The output part 103b of the torsional vibration damper 90b is connected, via a toothing, with the turbine hub 25b so as to be fixed with respect to rotation relative to it.

FIG. 4 shows yet further embodiment of hydrodynamic clutch device 200c in which elements which correspond to similar elements in FIGS. 1, 2 and 3 have the same reference number with a suffix "c". FIG. 4 shows the construction of the hydrodynamic circuit 32c in the radial center area of a clutch housing 1c. While this is disadvantageous for the torque absorption of this circuit 32c compared with the embodiments according to FIG. 2 or 3, it is acceptable particularly when the hydrodynamic circuit 32c is loaded only briefly, for example, when starting, and is otherwise driven with a closed lockup clutch 84c while bypassing the hydrodynamic circuit 32c. The advantage of the construction according to FIG. 4 is that the torsional vibration damper 90c is shifted radially outward, so that a very large spring volume is achieved and torsional vibrations may be effectively cushioned when the lockup clutch 84c is closed. In the present case, the input part 92c of the torsional vibration damper 90c is connected, via a toothing 128c, with the plate 124c of the lockup clutch 84c, while the output part 103c engages, via a toothing 136c, at the turbine base 24c of the turbine wheel 23c so as to be fixed with respect to rotation relative to it. Further, the turbine base 24c receives two elastomer seals 51c of seal 49c. One of the elastomer seals 51c contacts the impeller hub 11 and the other elastomer seal 51c contacts a bend 58c at the radially inner end of the dividing wall 53c between the hydrodynamic circuit 32c and the residual circuit 108c. The dividing wall 53c is also constructed as a diaphragm-like element 57c again in this case and can accordingly provide for pressure compensation. Consequently, it is possible to use stationary elastomer seals 51c in the seal 49c.

The invention is not limited by the embodiments described above which are presented as examples only but can be modified in various ways within the scope of protection defined by the appended patent claims.

I claim:

1. A hydrodynamic clutch device connectable to a drive and comprising a plurality of clutch-components including:
    a hydrodynamic circuit comprising an impeller wheel connectable with the drive and rotatably mounted about an axis of rotation and a turbine wheel rotatably mounted about said axis of rotation, said hydrodynamic circuit being filled with a first medium having a first density;
    a residual circuit comprising a lockup clutch operatively connected for selectively fixing said turbine wheel to a component connected with said impeller wheel;
    a hydraulic supply stem having switchable pressure medium lines operatively connected to said residual circuit for supplying a second medium having a second density to said residual circuit for controlling said lockup clutch, wherein a density of said first medium exceeds a density of said second medium; and
    a dividing wall arranged for substantially isolating said hydrodynamic circuit from said residual circuit.

2. The hydrodynamic clutch device of claim 1, wherein said dividing wall between said hydrodynamic circuit and said residual circuit comprises a diaphragm-like element.

3. The hydrodynamic clutch device of claim 1, wherein one of said plurality of clutch components is mounted for rotation with said turbine wheel and another of said plurality of clutch components is mounted for rotation with said impeller wheel, one end of said dividing wall being fixedly connected to said another of said plurality of clutch components and said hydrodynamic clutch device further comprises a first seal mounted between another end of said dividing wall and said one of said plurality of clutch components.

4. The hydrodynamic clutch device of claim 3, wherein said first seal comprises a pressure-compensating valve element.

5. The hydrodynamic clutch device of claim 4, wherein said first seal comprises at least one spring-loaded sealing means.

6. The hydrodynamic clutch device of claim 4, wherein said first seal is operatively arranged for shifting position relative to said dividing wall in response to a pressure difference between said hydrodynamic circuit and said residual circuit.

7. The hydrodynamic clutch device of claim 3, wherein said seal comprises an elastomer seal arranged in a stationary position between said dividing wall and said one of said plurality of clutch components.

8. The hydrodynamic clutch device of claim 1, further comprising a clutch housing connected to said impeller wheel wherein one end of said dividing wall is fastened to said clutch housing and another end of said dividing wall contacts a first seal arranged on one of said plurality of clutch components that is movable relative to said clutch housing.

9. The hydrodynamic clutch device of claim 1, wherein said first medium comprises an oil of higher density selected from the group consisting of polyglycol and silicone oil.

10. The hydrodynamic clutch device according to claim 1, wherein said first medium comprises a carrier fluid enriched with solid particles of high density.

11. The hydrodynamic clutch device according to claim 10, wherein said solid particles comprise graphite powder.

12. The hydrodynamic clutch device of claim 1, wherein said hydrodynamic circuit further comprises a stator wheel arranged between said impeller wheel and said turbine wheel, one of said plurality of clutch components being mounted for rotation with said turbine wheel and another said plurality of clutch components is mounted for rotation with said impeller wheel, one end of said dividing wall being fixedly connected to said another of said plurality of clutch components, and said hydrodynamic clutch device further comprising a first seal mounted between another end of said dividing wall and said one of said plurality of clutch components, wherein said hydrodynamic circuit is sealed relative to said residual circuit by an additional seal supplementing said first seal.

13. The hydrodynamic clutch device of claim 12, wherein said additional seal is arranged between said impeller wheel and said stator wheel and between said stator wheel and said turbine wheel.

14. The hydrodynamic clutch device of claim 13, wherein said stator wheel comprises a stator hub and said additional seal is received in said stator hub and held in contact with one of said impeller wheel and said turbine wheel to seal a radial inner side of said hydrodynamic circuit relative to the residual circuit.

* * * * *